(12) United States Patent
Desmond et al.

(10) Patent No.: US 9,098,531 B2
(45) Date of Patent: Aug. 4, 2015

(54) METHOD AND APPLICATION FOR MANAGING DIGITAL FILES

(75) Inventors: Christopher J. Desmond, Glen Ellyn, IL (US); Nancy L. Desmond, Glen Ellyn, IL (US); L. Michael Taylor, Chicago, IL (US)

(73) Assignee: MemoryWeb, LLC, Glen Ellyn, IL (US)

( * ) Notice: Subject to any disclaimer, the term of this patent is extended or adjusted under 35 U.S.C. 154(b) by 0 days.

(21) Appl. No.: 13/157,214

(22) Filed: Jun. 9, 2011

(65) Prior Publication Data

US 2012/0317111 A1 Dec. 13, 2012

(51) Int. Cl.
*G06F 7/00* (2006.01)
*G06F 17/30* (2006.01)

(52) U.S. Cl.
CPC ...... *G06F 17/30268* (2013.01); *G06F 17/3028* (2013.01); *G06F 17/30946* (2013.01); *G06F 17/30997* (2013.01)

(58) Field of Classification Search
CPC .......... G06F 17/30268; G06F 17/3028; G06F 17/30946; G06F 17/30998; G06F 17/30997
See application file for complete search history.

(56) References Cited

U.S. PATENT DOCUMENTS

| 7,372,976 B2 * | 5/2008 | Rhoads et al. ................ 382/100 |
| 7,480,669 B2 * | 1/2009 | Lo et al. .............................. 1/1 |
| 8,150,844 B2 * | 4/2012 | Redstone et al. ............. 707/724 |
| 2007/0282908 A1 * | 12/2007 | Van der Meulen et al. .......................... 707/104.1 |

OTHER PUBLICATIONS

Kustanowitz et al., "Motivating Annotation for Personal Digital Photo Libraries: Lowering Barriers while Raising Incentives", Tech. Report HCIL-2004-18, U. Maryland, 2005.*
Miller et al., "Give and take: a study of consumer photo-sharing culture and practice", CHI '07 Proceedings of the SIGCHI Conference on Human Factors in Computing Systems, pp. 347-356, 2007.*
Ames et al., "Why we tag: motivations for annotation in mobile and online media", CHI '07 Proceedings of the SIGCHI Conference on Human Factors in Computing Systems, pp. 971-980, ACM, 2007.*
Yee et al., "Faceted Metadata for Image Search and Browsing", CHI 2003, pp. 401-408, 2003, ACM.*
Ferre, "CAMELIS: Organizing and Browsing a Personal Photo Collection with a Logical Information System", Int. Conf. Concept Lattices and Their Applications, pp. 112-123, 2007, HAL.*
Tomasson et al., "PhotoCube: Effective and Efficient Multi-Dimensional Browsing of Personal Photo Collections", ICMR '11, 2011, ACM.*
Bartolini et al., "Integrating Semantic and Visual Facets for Browsing Digital Photo Collections", SBED, pp. 65-72, 2009.*

* cited by examiner

*Primary Examiner* — Michael Hicks
(74) *Attorney, Agent, or Firm* — Nixon Peabody LLP

(57) ABSTRACT

A web-based digital file storage system is disclosed. The storage system may include a digital file repository for storing and retrieving digital files, such as photos, a digital tagging system configured to assign digital tags to the digital files, a sorting system, and a user interface.

18 Claims, 19 Drawing Sheets

Location:
Historical Society
Lisle, IL 60532

Comments:
Suzanne and Anthony's Wedding Party where the cousins posed for a photo in the grass. Note, Jack with the lollipop and the photographer with his shoe in the photo People:
Jack Wong
CJ Wong
Mary Firestone
Zoe Peika
Nick Persons Event: Suzanne & Anthony's Wedding Reception 2010

Camera Details: more

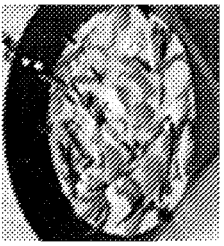

Desmond's Yellow Thai Chicken Curry

Curry Mix
- Coconut milk (400 ml) – DO NOT SHAKE IT UP
- 800 gram of chicken (4 chicken breast)
- Fish sauce (Nam Pla) Thai Bamboo Garden – Bottle
- Garlic (2 cloves)
- Broccoli (2 cups chopped)
- 2 Peppers (chopped)
- 2 Carrots (chopped)
- 1 Zucchini (chopped)
- Thai Basil (8 leaves)
- Lemon Grass (in jar) 1 teaspoon
- Chinese Ginger Root (in jar) 1 teaspoon Rice
- Thai Rice (something that only takes 2 cups of water)
- Dice chicken in bowl and add two tablespoons of fish sauce. Let marinate for 20 minutes.
- Take thick part of coconut milk out into pan (about 4 tablespoons), Curry paste, 1 spoon of lemon grass, 1 spoon of ginger and garlic. Heat over high with boil and THEN stir for 1 minute. Add meat (uncooked) and fry until cooked over high heat
- Add milk, brown sugar and salt. Bring back to slight boil and constantly stir. Add veggies and soy sauce. Cook for about 10-14 minutes COVERED until veggies are cooked. Serve with a smile.

Chef: Barry Desmond

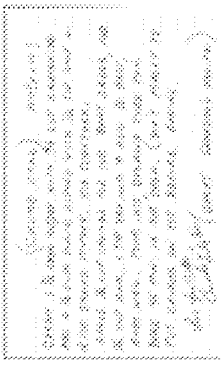

Video on How to Make It

Original Handwritten Recipe

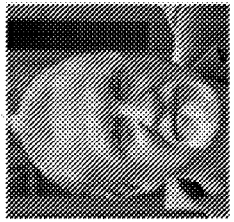

Fig. 11

| Album/Event | Date | Location | # Photos | # Videos | # Docs |
|---|---|---|---|---|---|
| Jack Monk's Arrival | 26-Dec-2003 | Chicago, IL | 69 | 4 | 4 |
| Mike Testy's First Birthday | 13-Sep-1983 | Minneapolis, MN | 54 | 21 | 0 |
| Cubs Beat Cards 1998 | 5-Aug-1998 | Chicago, IL | 36 | 2,199 | 2 |
| Jack Monk's Arrival | 29-Dec-2003 | Chicago, IL | 69 | 4 | 4 |
| Mike Testy's 2nd Birthday | 13-Sep-1983 | Minneapolis, MN | 54 | 21 | 0 |
| Cubs Beat Cards 1998 | 5-Aug-1998 | Chicago, IL | 36 | 2,199 | 2 |
| Jack Monk's Arrival | 29-Dec-2003 | Chicago, IL | 69 | 4 | 4 |
| Mike Testy's 3rd Birthday | 13-Sep-1983 | Minneapolis, MN | 54 | 21 | 0 |
| Cubs Beat Cards 1998 | 5-Aug-1998 | Chicago, IL | 36 | 2,199 | 2 |
| Jack Wrigley Monk's Arrival | 29-Dec-2003 | Chicago, IL | 69 | 4 | 4 |
| Mike Testy's 4th Birthday | 13-Sep-1983 | Minneapolis, MN | 54 | 21 | 0 |
| Cubs Beat Cards 1998 | 5-Aug-1998 | Chicago, IL | 36 | 2,199 | 2 |
| Nancy Learns How to Ride a Bike | 21-Jul-1978 | St. Louis, MO | 76 | 2 | 0 |

Thumbnail | Table

Fig. 12

| Album/Event | Date | Location | # Photos | # Videos | # Docs |
|---|---|---|---|---|---|
| Jack Monk's Arrival | 26-Dec-2003 | Chicago, IL | 69 | 4 | 4 |
| Mike Testy's First Birthday | 13-Sep-1983 | Minneapolis, MN | 54 | 21 | 0 |
| Cubs Beat Cards 1998 | 5-Aug-1998 | Chicago, IL | 36 | 2,199 | 2 |
| Jack Monk's Arrival | 29-Dec-2003 | Chicago, IL | 69 | 4 | 4 |
| Mike Testy's 2nd Birthday | 13-Sep-1983 | Minneapolis, MN | 54 | 21 | 0 |
| Cubs Beat Cards 1998 | 5-Aug-1998 | Chicago, IL | 36 | 2,199 | 2 |
| Jack Monk's Arrival | 29-Dec-2003 | Chicago, IL | 69 | 4 | 4 |
| Mike Testy's 3rd Birthday | 13-Sep-1983 | Minneapolis, MN | 54 | 21 | 0 |
| Cubs Beat Cards 1998 | 5-Aug-1998 | Chicago, IL | 36 | 2,199 | 2 |
| Jack Wrigley Monk's Arrival | 29-Dec-2003 | Chicago, IL | 69 | 4 | 4 |
| Mike Testy's 4th Birthday | 13-Sep-1983 | Minneapolis, MN | 54 | 21 | 0 |
| Cubs Beat Cards 1998 | 5-Aug-1998 | Chicago, IL | 36 | 2,199 | 2 |
| Nancy Learns How to Ride a Bike | 21-Jul-1978 | St. Louis, MO | 76 | 2 | 0 |

Thumbnail | Table

Fig. 13

| Last Name | # People | # Photos | # Videos | # Docs |
|---|---|---|---|---|
| + Alberts | 2 | 8 | 0 | 0 |
| + Annex | 2 | 7 | 0 | 0 |
| + Bade | 3 | 8 | 0 | 0 |
| + Bacon | 4 | 8 | 0 | 0 |
| + Bates | 5 | 7 | 1 | 0 |
| + Boone | 6 | 6 | 2 | 2 |
| + Danas | 7 | 5 | 4 | 1 |
| + Danes | 8 | 7 | 3 | 2 |
| − Monk (All) | 2 | 499 | 4 | 14 |
|    Monk, CJ | 1 | 200 | 2 | 7 |
|    Monk, Jack | 1 | 199 | 2 | 7 |
| + Firestone | 21 | 1249 | 17 | 39 |
| + Moore | 1 | 4 | 6 | 3 |
| + Slythe | 1 | 9 | 0 | 9 |
| + Stein | 2 | 249 | 1 | 3 |
| + Testy | 4 | 788 | 2 | 12 |

Thumbnail | Table

Fig. 14

| Last Name | Relationship | # Photos | # Videos | # Docs |
|---|---|---|---|---|
| Alberts, John | Cousin | 8 | 0 | 0 |
| Killian, Jack | Son | 7 | 0 | 0 |
| Killian, Brian | Nephew | 8 | 0 | 0 |
| Killian, Kevin | Nephew | 8 | 0 | 0 |
| Killian, Sarah | Daughter-in-law | 7 | 1 | 0 |
| Killian, John | Great Nephew | 6 | 2 | 2 |
| Killian, Mark | Great Nephew | 5 | 4 | 1 |
| Killian, Louis | Great Grandson | 7 | 3 | 2 |
| Killian, John | Grandson | 499 | 4 | 14 |
| Monk, CJ | Great Grandson | 200 | 2 | 7 |
| Monk, Jack | Great Grandson | 199 | 2 | 7 |
| Firestone, Mike | Third Cousin | 1249 | 17 | 39 |
| Moore, Bertha | Great Niece | 4 | 6 | 3 |
| Slythe, Sarah | Sister | 9 | 0 | 9 |
| Killian, John | Brother | 249 | 1 | 3 |
| Killian, Mike | Brother | 788 | 2 | 12 |

Thumbnail | Table

Fig. 15

| Location Name | Address | City | State | Country | # Photos | # Videos | # Docs |
|---|---|---|---|---|---|---|---|
| Dom | | Cologne | | Germany | 3 | 2 | 0 |
| Lucilla & Roberto | | Montalcino | | Italy | 6 | 1 | 0 |
| Lisle Home | 898 West St | Lisle | IL | USA | 45 | 12 | 2 |
| College | 545 Market | Akron | OH | USA | 64 | 2 | 0 |
| Amazon Trip | | Manus | | Brazil | 235 | 8 | 2 |
| Cabin | 999 Pine | Lake Geneva | WI | USA | 98 | 2 | 0 |
| Grad School | 903 Plymouth | Charleston | IL | USA | 1256 | 32 | 4 |
| Griffith Park | 298 Glencarin | Los Feliz | CA | USA | 12 | 0 | 0 |
| LA Equestrian Ctr | 568 Horse Dr | Glendale | CA | USA | 4 | 4 | 0 |
| Del Coronado | 12 Coronado Dr | Coronado | CA | USA | 321 | 4 | 0 |
| Fenway Park | 123 Yawke | Boston | MA | USA | 57 | 3 | 5 |
| Wrigley Field | 1190 W Addison | Chicago | IL | USA | 498 | 7 | 3 |
| Home | 444 Main | Anywhere | IL | USA | 10,987 | 49 | 9 |
| GA Grill Party | 321 Silver | Macon | GA | USA | 15 | 0 | 0 |
| Pike's Market | 786 Market | Seattle | WA | USA | 18 | 1 | 0 |
| Raffels | 345 Fong | Singapore | | Singapore | 23 | 2 | 0 |

Thumbnail | Table

Fig. 19

Captain Phil's Memory-Webb

Welcome, Captain Phil
Last Login:   11.18.2010

My recent memories:
- 123 Photos uploaded on 11.07.10
- 2 albums created 11.17.10
- 12 visitors since last login date
- 123 Photos uploaded on 11.07.10
- 2 albums created 11.17.10

My recent Webb views:
- Captain Phil 2010 (photo album)
- Chicken Pot Pie (recipe)
- Captain Phil (Timeline)

Updates and Alerts:
- License renewal due 1.15.2011

| Media | Count |
|---|---|
| # Photos | 1,342 |
| # Videos | 75 |
| # Documents | 173 |

| Archive Status | Count |
|---|---|
| | 80% complete |
| | 61% complete |

People Stats:

| Last Name | # People | # Photos | # Videos | # Docs |
|---|---|---|---|---|
| Monk | 7 | 499 | 4 | 14 |
| Firestone | 11 | 1,249 | 17 | 39 |
| Testy | 4 | 788 | 1 | 12 |

Event Stats:

| Event | Date | Location | # Media |
|---|---|---|---|
| Mike Testy's 1st Birthday | 13-Sept-1988 | Minneapolis, MN | 21 |
| Cubs Beat Cards Aug 1998 | 5-Aug-1998 | Chicago, IL | 2,199 |
| Nancy Learns to Ride Bike | 21-July-1978 | St. Louis, MO | 2 |

METHOD AND APPLICATION FOR MANAGING DIGITAL FILES

SCOPE OF INVENTION

The present invention relates to a digital file management service. More particularly, the present invention relates to a method and application for organizing, viewing, sorting, notating, distributing, storing, sharing and archiving digital files.

BACKGROUND AND SUMMARY OF INVENTION

Prior to the invention of digital photography, people tended to share photos by displaying printed copies in frames and albums or would store them in a container in hope of preserving these assets preserved for future use or future generations. Important photos would often be inscribed on the back with significant details (people, location, and event) to preserve the memory of that particular occasion. Many people would share their memories by assembling an album that could be viewed with others. Occasionally, extra copies of special photos may have been printed for friends, relatives, etc. Film slide shows were also a popular medium for sharing photo memories.

With the evolution of digital files, there has been explosive growth in the number of individuals taking photos, making movies and gathering digital documents and in the sheer number of files people are capturing digitally. Today, virtually every personal computing device contains some kind of photo, movie or other type of digital file.

At the same time, there is little to no cost for people to store large amounts of photos in various "containers" of the modern age. Facebook, Flickr, Shutterfly and countless other social media and specialty digital files sites allow users to post and share images to a community with a frequency and ease that continues to feed the fire of the digital revolution.

What is needed to complement the widespread availability of digital files is a medium that allows people to organize, view, preserve and share these files with all the memory details captured, connected and vivified via an interactive interface. Such a solution would allow digital files, including documents, photos, videos and audio, to tell a full story now, and for generations to come.

The present disclosure relates to one or more of the following features, elements or combinations thereof. A web-based digital file storage system is disclosed. The storage system may include a digital file repository for storing and retrieving digital files, such as photos, a digital tagging system configured to assign digital tags to the digital files, a sorting system, and a user interface.

The digital tagging system may include various types of data, such as a person's name, a location, a recipe, a date, a family relationship to the user, an event name, a rating, sharing rights, file type and a document name. The sorting system can allow the digital files to be searched and sorted according to a plurality of types of data and can be used for creating and organizing special views. The user interface may be user-configurable, and can present the digital files on a user's screen based on these user inputs.

The digital file repository may be accessible over the Internet. The sorting system may provide a user with the ability to search based on a plurality of digital tags. The disclosed system may also provide a way to track relationships between users, so that a family tree can be displayed.

Recipes may also be linked to a person's name, with, for example, a video and digital copy of original hand-written recipe to create a recipe view.

Moreover, the digital files and data can be exported as a single file with the digital tagging embedded within the exported file.

In another embodiment, a method of storing digital photographs is disclosed. The method may include the steps of storing a digital photograph in a file repository, associating a plurality of digital tags having different tag types with the digital photograph, providing a search function that permits searching by a plurality of digital tag types and provides a search result, and providing a user-configurable output to display the search result. The digital tag types may include, for example, a person's name, a location, a recipe, a date, a relationship, an event name, a rating, file type and a document type. The method may include a further step of providing access to the file repository via the Internet. The method may also allow for tracking relationships between users so that a family tree can be displayed.

Additional features of the disclosure will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 3 is a screenshot of a gallery view of an event or album of one embodiment of the disclosed system;

FIG. 6 is a screenshot of a people thumbnail view of one embodiment of the disclosed system;

FIG. 10 is a screenshot of a recipe chart, according to one embodiment of the disclosed system;

FIG. 11 is a screenshot of an album chart view of one embodiment of the disclosed system;

FIG. 12 is a screenshot of an event chart view of one embodiment of the disclosed system;

FIG. 13 is a screenshot of a people chart view of one embodiment of the disclosed system;

FIG. 14 is a screenshot of a family tree chart view of one embodiment of the disclosed system;

FIG. 15 is a screenshot of a location chart view of one embodiment of the disclosed system;

FIG. 19 is a screenshot of a homepage view of one embodiment of the disclosed system.

DETAILED DESCRIPTION OF THE DRAWINGS

The presently disclosed method and application (herein alternatively referred to as a "system") provides users with an Internet-based interactive platform to gather, organize, view, share and archive digital files using a proprietary organization system and export tagging process. As used herein, the word "tag" refers to any type of digital data that can be assigned to a file to describe some aspect of that file through a tagging process. For images, the tagging is preferably in EXIF format. For videos, documents and other file formats, any appropriate format may be used. The disclosed system allows users to create, view and share digital files, which could represent, for example, the memories a user has collected from the past and present, and could incorporate additional memories for generations to come. As outlined herein, various embodiments are disclosed that can accomplish these and other goals.

One disclosed embodiment includes an import feature. Users can import media files from users' favorite sources (e.g., computers, mobile phones, social networks, etc.). If any meta-tag information is embedded within the media (e.g., date taken and GPS coordinates), the system could automatically read and utilize it for the user. Digital files, media, meta-tags, and other data discussed herein may be saved to one or more file repositories (also referred to as a database herein).

Figure 1:
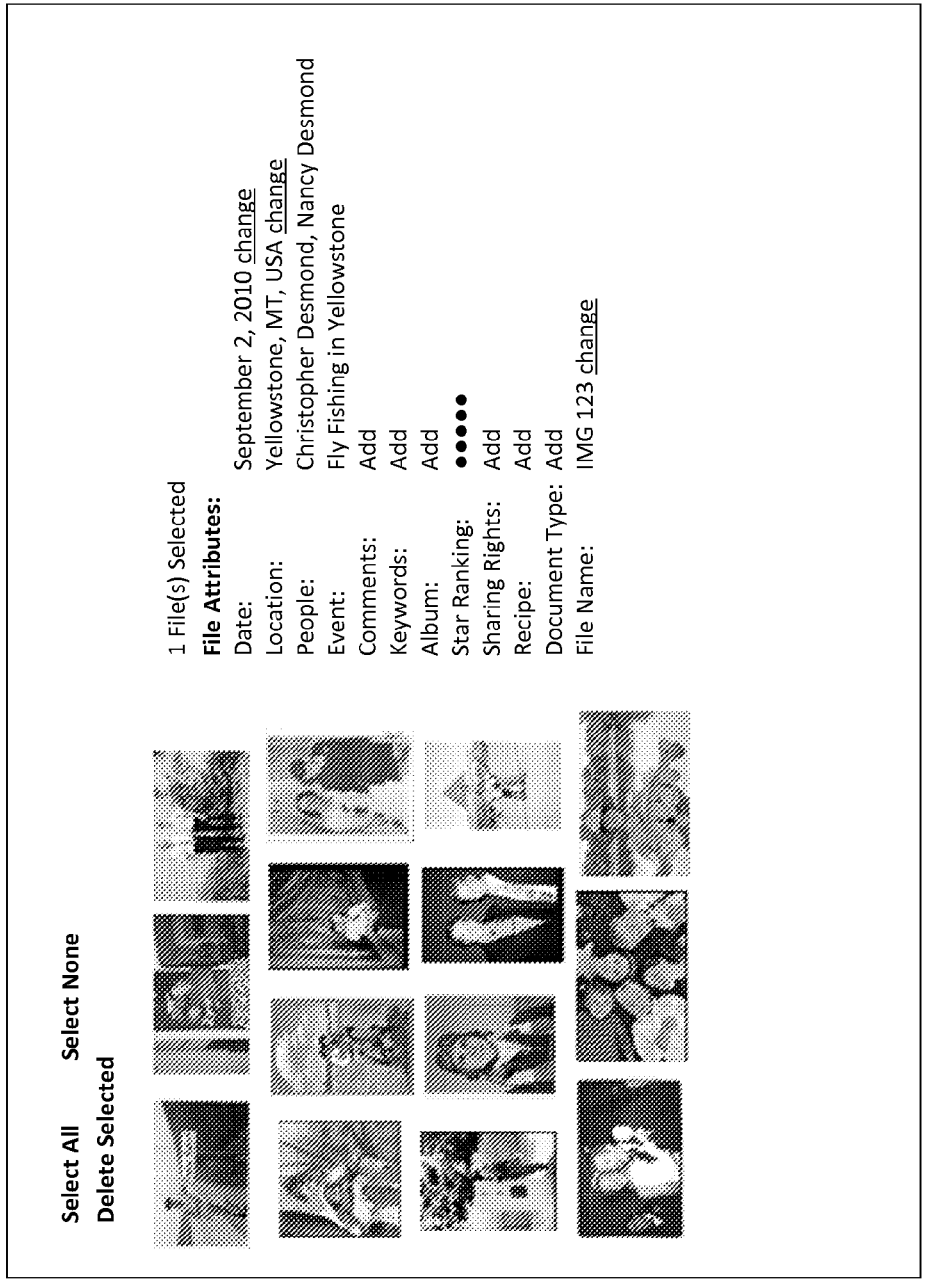
FIG. 1 is a screenshot of an organizational functionality view of one embodiment of the disclosed system.

In another aspect of the disclosed system, organizational functionality is provided. Similar to the concept of writing certain information "on the back of a photo," the system's digital tagging system and organizing feature allows a user to arrange large amounts of digital files with tags that can characterize and document the digital file(s). Digital files can be individually or group organized at the same time for many tags including, but not limited to, a person's name, family relationships of the subjects to the user and between each other (e.g., mother/father), location, date, event, album, comments, document type (e.g., birth certificate, poetry), recipe, ranking or rating, and sharing rights. Tags can be assigned to a single file at a time, or to a plurality of files at once. For example, if a user wishes to assign the tag "grandma" to 100 photos at once, the system provides a way for a user to select all 100 photos and enter the tag only once. An example of the manner in which digital photos can be organized is presented is seen in FIG. 1.

Figure 2:
FIG. 2 is a screenshot of a photo detail view of one embodiment of the disclosed system.

Yet another feature is the multiple views from which a user can display his or her digital media files and their tagged attributes. Using a user interface (e.g. a keyboard, mouse, or touch screen), users can select individual files, groups of files meeting specific criteria, or all files in their account from which to create views. These views may alternately take the form of a chart. These views will be auto-populated based upon either tag information already associated with the digital file upon import or the tags assigned to the digital files by the user within the aforementioned organization functionality. Each digital file can be enlarged, from any view or chart, by clicking an information ("i") button to show an enlarged version of the digital media file with all the tags that are assigned to that digital file, as illustrated in FIG. 2. In another embodiment, the user interface may be user-configurable, as discussed further herein.

Figure 3:
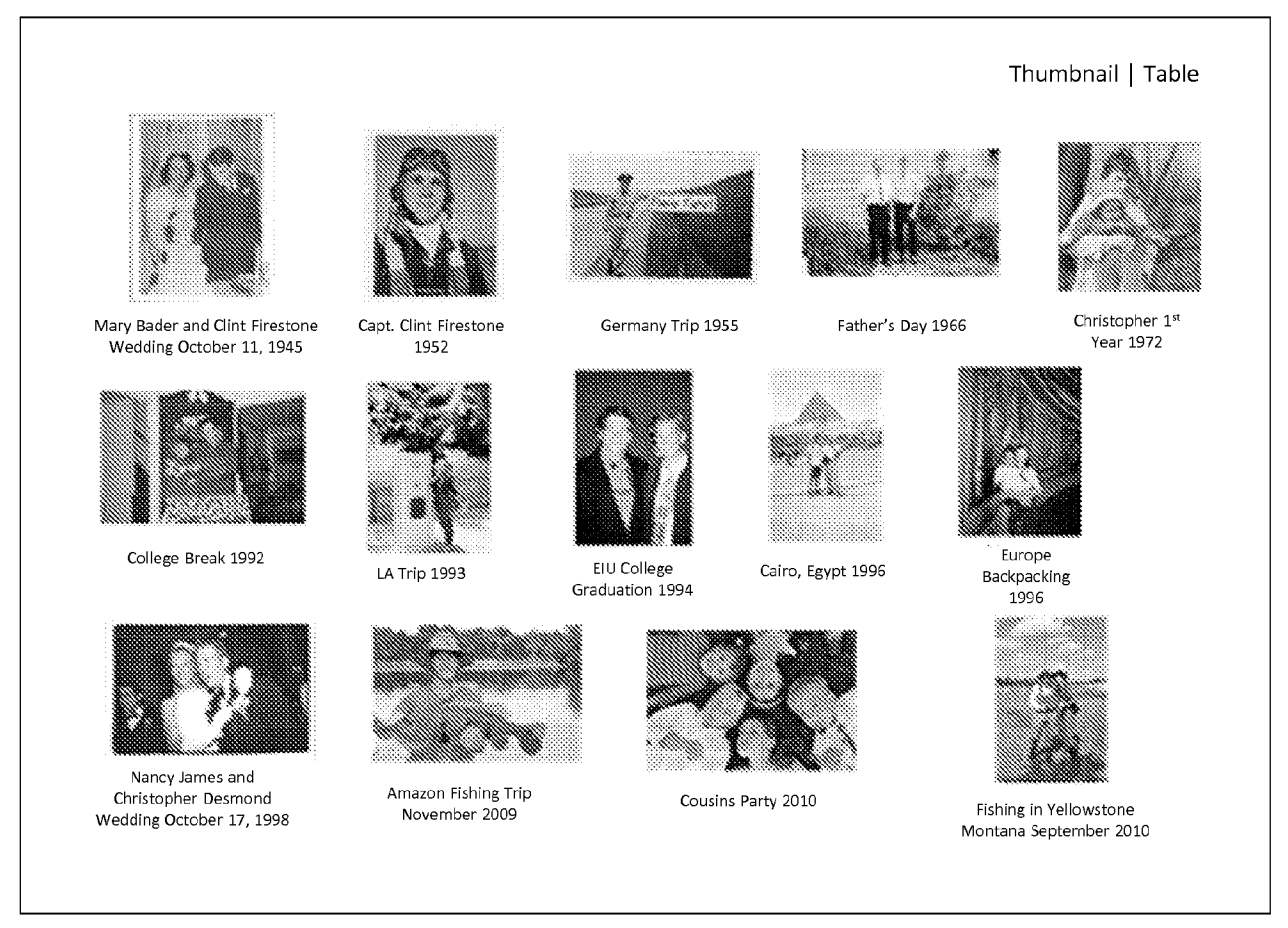

The following views are shown with particularity. In FIG. 1, the gallery view allows the user to see all the digital media that are associated within a group such as an event or custom album. The gallery view for either events or albums is illustrated in FIG. 3.

Figure 4:
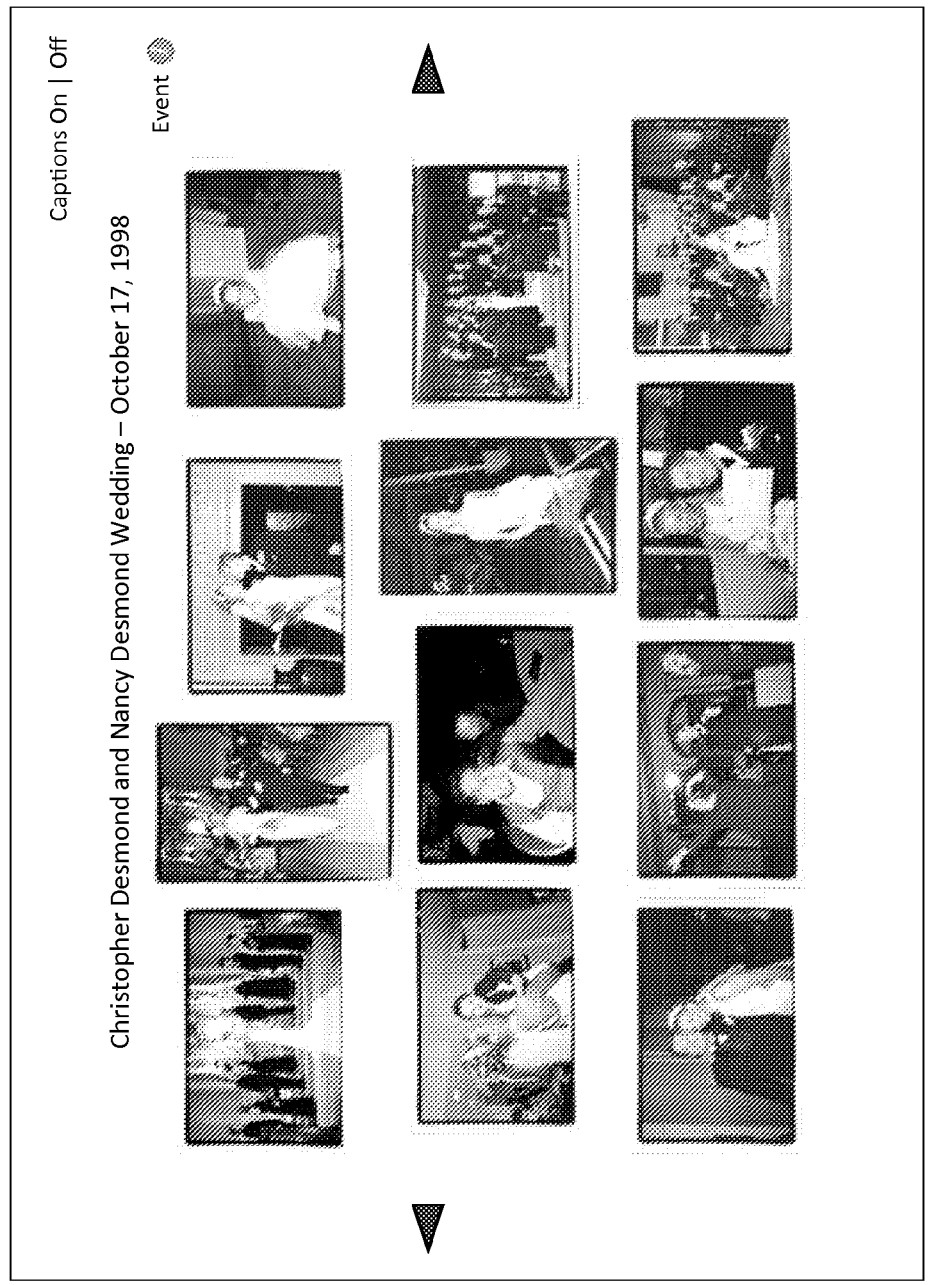
FIG. 4 is screenshot of an individual event or album view of one embodiment of the disclosed system.

As shown in FIG. 2, an individual album or event view allows one to see the files associated with a specific group. For example, one can view the digital files that relate to a group of files called "Trip to Italy 2011". The individual album or event view is illustrated in FIG. 4.

Figure 5:
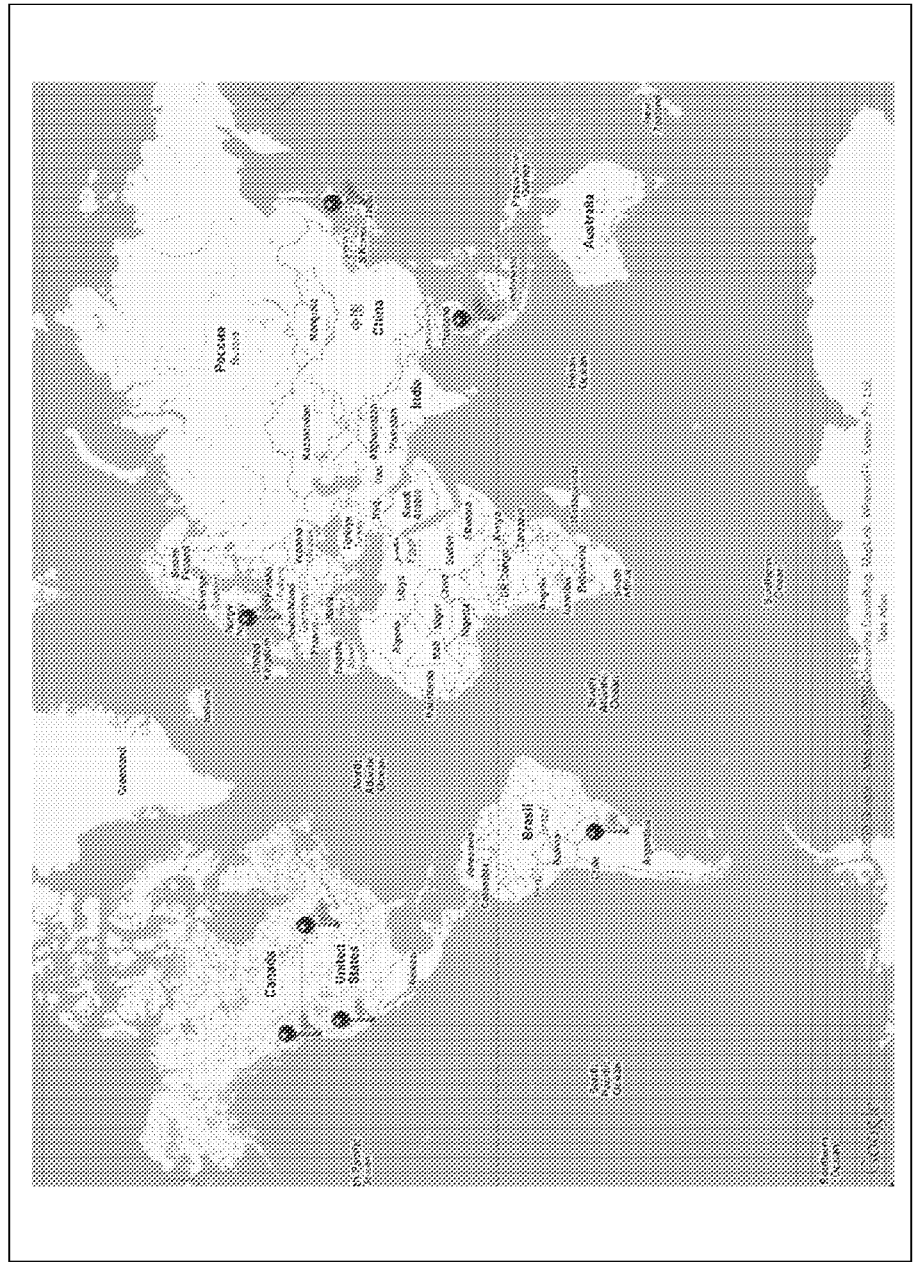
FIG. 5 is a screenshot of a location view of one embodiment of the disclosed system.

A location view, as shown in FIG. 5, identifies within an interactive map (Google map shown as an example), where digital files were taken or originated. The location view can also provide additional outputs such as a journey route that identifies the specific locations for an event or trip that can be customized by users.

Figure 7:
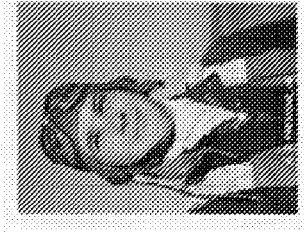
FIG. 7 is a screenshot of a people profile view of one embodiment of the disclosed system.

A people view, as shown in FIG. 6, shows thumbnail photos of all the people in the system that can be clicked in for a people profile view. A people profile view, as shown in FIG. 7, shows a profile picture of an individual, their birth/death information, family relationships, overview (comments) on the person, as well as links to other views that contain that individual in the system.

Figure 8:
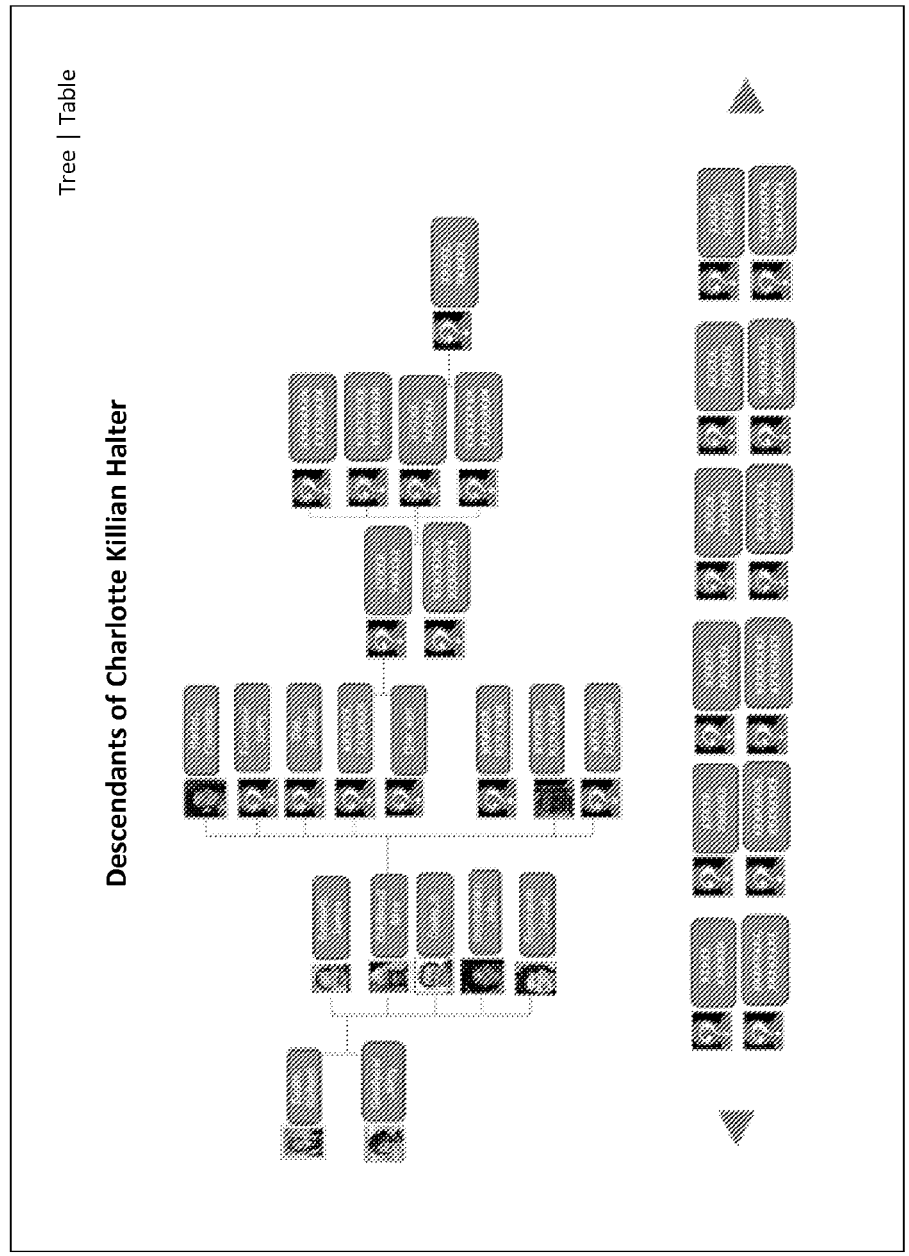
FIG. 8 is a screenshot of a family tree view of one embodiment of the disclosed system.

A family tree view, as shown in FIG. 8, can illustrate interactive family trees where one can see the family tree of an individual or family. If a user clicks on an individual within the family tree, it will take him or her to the people profile view of that person.

Figure 9:
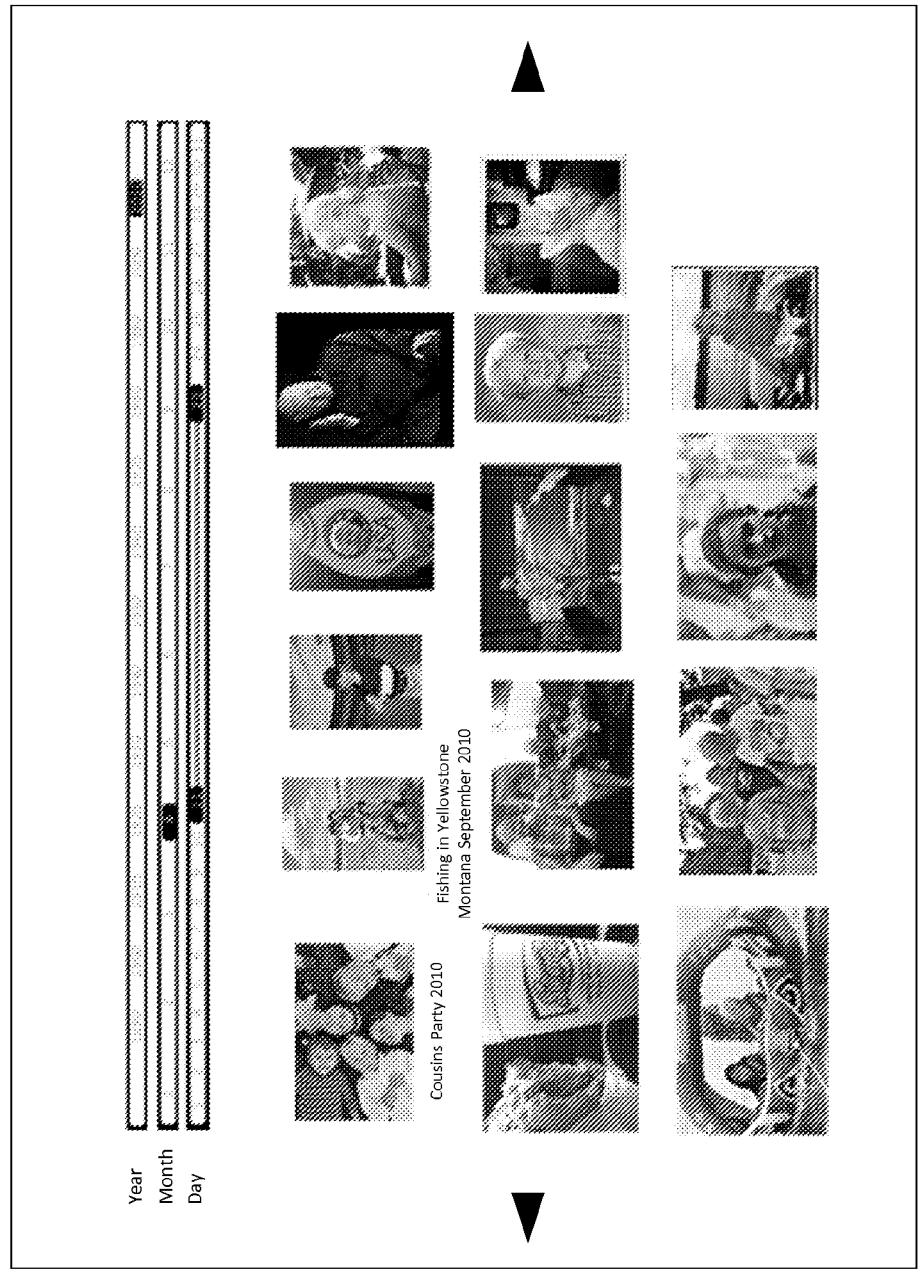
FIG. 9 is a screenshot of a timeline view of one embodiment of the disclosed system.

The timeline view, as shown in FIG. 9, will be an interactive timeline that allows you to set ranges of digital files by year, month and day. The digital files shown in the timeline will also be interactive and if the user clicks on a digital file or group of digital files (e.g., event or album), the user will then view the information related to the digital file(s).

A recipe view, as shown in FIG. 10, will show a recipe along with any digital files that are associated with it. For example, a cherished family recipe may show a digital copy of the original handwritten recipe, a photo of the family member who was the chef and a video of the family member making the recipe.

Each of the aforementioned views may also be seen in a chart format view that is interactive when any item on the chart is clicked, the user will them be taken to a new screen that details all relevant digital files (and file types) for the clicked item.

For album or event chart views, as shown in FIGS. 11 and 12, the elements listed in those charts will include individuals who are part of each album/event, number of digital files, date and other pertinent information.

A people view, shown in FIG. 13, may demonstrate all the names of individuals that are in the system in an alphabetical listing. Such a people view can also contain details on each person such as the number of photos and videos that are associated with that person. The user can click on that person to pull up the profile view of the individual or click on the number of photos to see all the photos associated with that person.

In the family tree chart view, shown in FIG. 14, family lineage can be viewed in multiple ways. For example, a user can set himself as the tree anchor and then see a tree of all people entered into the database related to the user. The user could also set a contact as the tree anchor and then just view the descendants of that individual.

For a location chart view, as show in FIG. 15, listings of all the locations that are in the system are displayed along with the number of digital files, as well as names of persons associated with each. A user can click on the location to see all the digital media files that are associated with a specific location.

Figure 16:
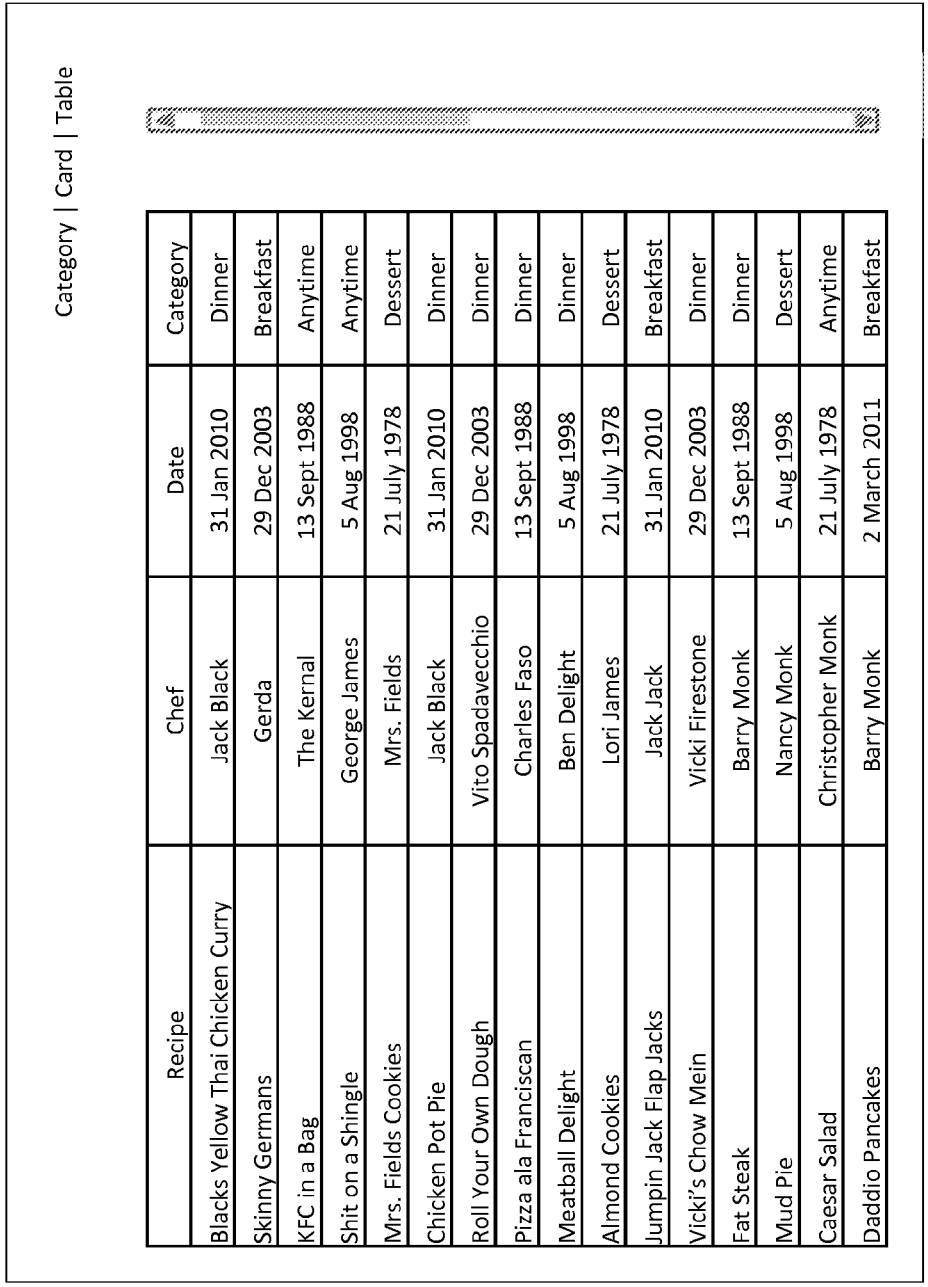
FIG. 16 is a screenshot of a recipe chart view of one embodiment of the disclosed system.

A recipe chart, as shown in FIG. 16, can show recipes that uploaded to the system. Along with the ingredients and steps of each recipe, this view can identify the chef(s) name, number of photos and videos associated with each.

Figure 17:
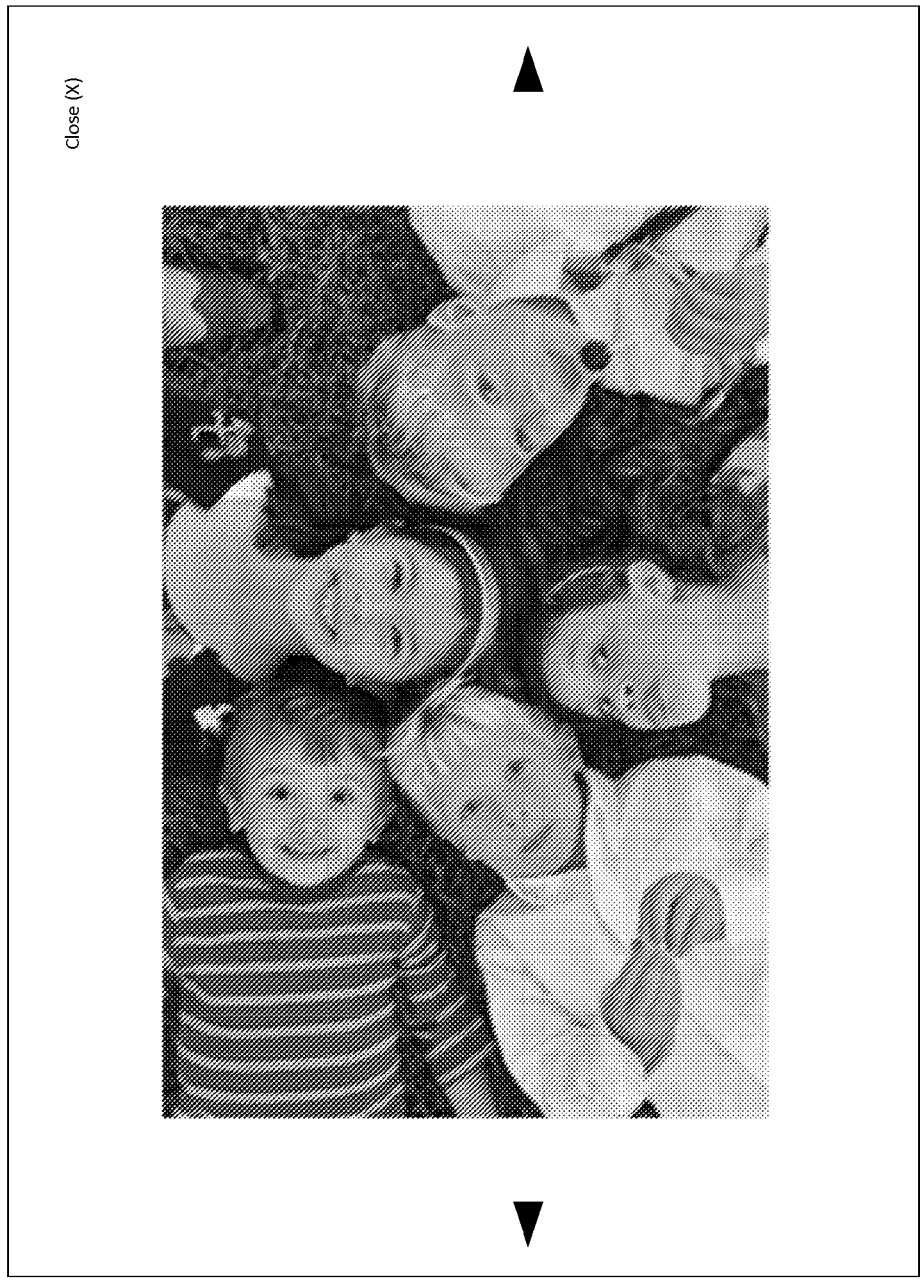
FIG. 17 is a screenshot of a slideshow view of one embodiment of the disclosed system.

For any of the views, the user can click on the digital file to start a slideshow feature that will allow them to scroll through an enlarged view of the digital file as illustrated in FIG. 17.

Another aspect of the disclosure is the search filter. This filter allows users to select one or more criteria that will narrow down their results to just those digital files matching input criteria. The entire system can be filtered by, for example, key words (or plurality of key words), event names, location, people, albums, star rating, file type, document type, and dates. A user may filter based on more than one criterion at a time. To help users quickly identify digital files that may still need to be organized, the advanced search filter also allows users to isolate files that have no date, no location, no people, no specific date/range, no upload date information or are lacking any other tag.

It should be noted that in one embodiment, searching via key word will search through all tagged information (user populated or auto-generated upon import). For example, if a user searched for the term "Ohio," the system would search for that term associated with any file in any way. If the user had files with Ohio as a state, file name, street name, person's name, file comment, etc., all would be retrieved.

Figure 18:
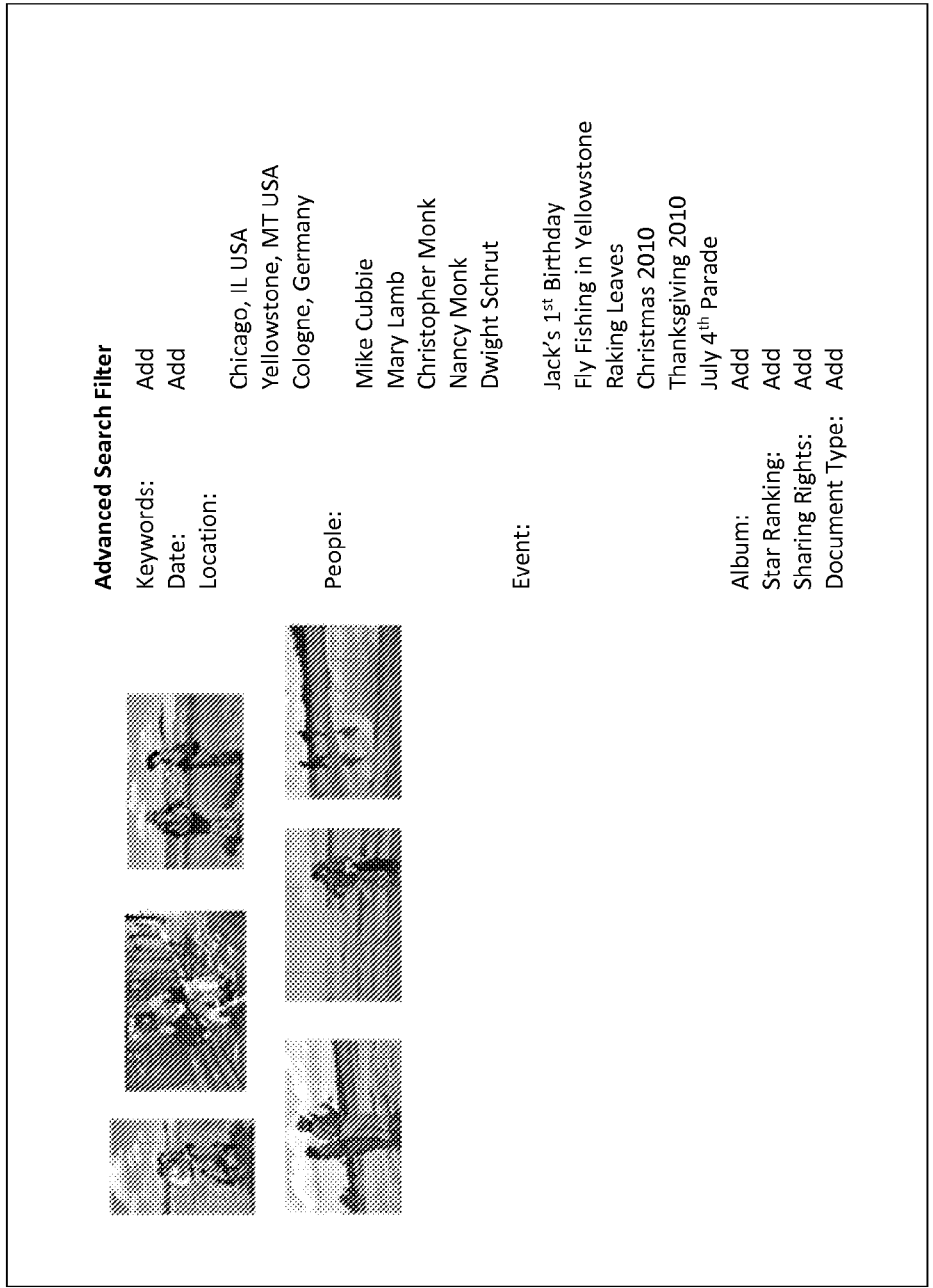
FIG. 18 is a screenshot of an advanced search filter view of one embodiment of the disclosed system.

Settings applied in the advanced search filter can cumulatively carry over to any subsequent pages until new criteria are selected. For example, a user can apply a filter to retrieve files associated with a particular person. Then the user can set a date range to further narrow results to show only those files for that selected person within the date range. Any pages viewed from that point forward throughout the entire site would only contain files associated with person and the date range specified. The advanced search filter is illustrated in FIG. 18.

Yet another feature can be a user's homepage, as illustrated in FIG. 19, that can summarize the user's content within the system including relevant information in the system. It is contemplated that a user's homepage may show a summary of the total number of photos, videos, documents and audio files that the user has uploaded. In this embodiment, for each group of digital files (e.g., photos), the percent of files that has been organized with pertinent data such as date, name(s) and location can be noted. In addition, the homepage can show a list of people that are in the system and the respective count for photos, videos, documents and audio files associated with each person. Also contemplated is a summary of the events, albums and locations that have been entered into the system. The user homepage may serve as an executive summary dashboard of one's entire system and can be modified to provide data in an executive summary format for a user.

Another feature is that the entire system including the dynamic views can be presented in a wide range of user outputs—e.g. on the user's computer, smartphone or tablet display. The user may choose to present the digital files in any of the various types of ways disclosed herein. Other ways of outputting the files are also possible. The user can create and modify various sharing rights so that third parties may view the files and if desired, provide comments, apply tags or even download/copy the files for their own use.

Still another embodiment can provide export functionality. Once a user has used the organization functionality to assign information to data file(s), a user may want to export the data file in its original form (e.g., .jpg, .mp4, etc.) with the tags embedded within the digital file in the form of EXIF tags. In other words, a user can export his or her entire set of digital files, or may choose a subset based on keywords and tags. The exported digital files can include key tags and attributes users have assigned, and in one embodiment, such tags and attributes can be embedded within the digital files. For example, each exported digital file may be imbedded with user-entered data such as the people, location, and event name. This feature will allow the users to back up their files to another source (e.g., external computer hard drive) or to transport it to another venue (e.g., another website that is used for viewing and/or sharing digital files such as a social media website) where it can be viewed with these attributes. This export feature can provide users with the advantage of never losing key data that was stored simply because the user chooses to move its digital files to a new digital archiving system.

A method is also disclosed. The method may include the steps of storing a digital file in a file repository, associating a plurality of digital tags having different tag types with the digital file, providing a search function that permits simultaneously searching by a plurality of digital tag types and provides a search result, and providing a user-configurable output to display the search result. The digital tag types may include, for example, a person's name, a location, a recipe, a date, a relationship between individuals, an event name, a rating, and a document type.

Under the disclosed method, access may be provided to the repository via the Internet. Relationships between users may also be tracked such that a family tree can be displayed. A recipe may also be linked to a user or person. Finally, the method may include the step of outputting a digital file and its associated digital tags into a single file.

While the disclosure is susceptible to various modifications and alternative forms, specific exemplary embodiments thereof have been shown by way of example in the drawings and have herein been described in detail. It should be understood, however, that there is no intent to limit the disclosure to the particular forms disclosed, but on the contrary, the intention is to cover all modifications, equivalents, and alternatives falling within the spirit and scope of the disclosure as defined by the appended claims.

A plurality of advantages arises from the various features of the present disclosure. It will be noted that alternative embodiments of various components of the disclosure may not include all of the features described yet still benefit from at least some of the advantages of such features. Those of ordinary skill in the art may readily devise their own implementations of a digital file organization system that incorporate one or more of the features of the present disclosure and fall within the spirit and scope of the disclosure.

What is claimed is:

1. A web-based proprietary digital photograph storage and sharing system, the system comprising:
   a digital file repository for storing and retrieving digital photographs via the Internet;
   a digital tagging system coupled to the digital file repository and configured to assign user-generated digital tags of arbitrary length to at least some of the digital photographs in response to user inputs, and embed such user-generated digital tags in the digital photographs in an exchangeable image file format (EXIF), wherein the user-generated digital tags include at least one type of data selected from the group consisting of a person's name, a location, a recipe, a date, a relationship, an event name, a rating, and a document type;
   a sorting system coupled to the digital file repository and configured to (i) conduct a first search of the digital file repository for digital photographs based on one or more of the user-generated digital tags at a time and (ii) retrieve such digital photographs from the digital file repository; and a user interface coupled to the digital file repository, the digital tagging system and the sorting system to display the digital tagging system, the sorting system and the retrieved digital photographs to a user, and to enable the user to input digital photographs to the digital file repository, and to assign one or more of the user-generated digital tags to selected digital photographs stored in the digital file repository, the user interface being configured to receive a user input to display thereon one or more of the digital photographs stored in the file repository in a plurality of views including a gallery view, an album view, a location view, a people view, a people profile view, a family tree view, and a timeline view; and wherein in response to the user interface receiving the user input to display, the sorting system retrieves digital photographs from the file repository and auto-populates the user interface based on one or more of the user-generated digital tags such that the retrieved digital photographs are displayed on the user interface along with a portion of the assigned user-generated digital tags associated with each of the displayed digital photographs retrieved from the digital file repository, the displayed digital photographs being displayed in the people view, the portion of the assigned user-generated digital tags including some, but not all, of the user-generated digital tags associated with each of the displayed digital photographs, wherein in response to the user clicking on a first digital photograph of a first person displayed in the people view, the sorting system auto-populates the user interface with a people profile view for the first person including (i) a profile picture of the first person, (ii) birth information for the first person, (iii) family relationships for the first person, and (iv) one or more clickable links to other ones of the plurality of views that include one or more digital photographs of the first person;

in response to the user clicking on a displayed number of digital photographs associated with the first person displayed in the people view, the sorting system auto-populates the user interface with all of the digital photographs in the digital file repository associated with the first person, and wherein the digital photographs including the embedded user-generated digital tags can be exported from the web-based proprietary digital photograph storage and sharing system in the exchangeable image file format (EXIF) and transferred to a different web-based digital photograph storage and sharing system without losing the user-generated digital tags, so that the transferred digital photographs can be viewed in the different web-based digital photograph storage and sharing system along with the transferred user-generated digital tags.

2. The system of claim 1, wherein the user interface organizes and presents the retrieved digital photographs based on the one or more of the user-generated digital tags selected by the user for the first search of the digital file repository.

3. The system of claim 1, further comprising a system for tracking relationships between users, so that a family tree can be displayed.

4. The system of claim 1, further comprising a system for linking a recipe to a person's name.

5. The system of claim 1, wherein the user interface is user-configurable.

6. The system of claim 1, wherein the digital tagging system is configured to assign one of the user-generated digital tags to a plurality of the digital photographs at once.

7. The system of claim 1, wherein the system is configured to display a recipe view using the user interface, the recipe view including one or more of the digital photographs assigned with a user-generated digital tag including recipe data, a first one of the one or more of the digital photographs being a digital photograph of a hand written recipe and a second one of the one or more of the digital photographs being a digital photograph of a chef of the recipe.

8. A computer-implemented method of storing and sharing digital photographs using a web-based proprietary digital photograph system, the method comprising:

storing digital photographs in a file repository from which said digital photographs can be retrieved via the Internet, the digital photographs in the file repository being configured to be displayed, on a display device, in a plurality of views including a gallery view, an album view, a location view, a people view, a people profile view, a family tree view, and a timeline view;

associating a plurality of user-generated digital tags of arbitrary lengths having different tag types with at least some of the stored digital photographs in response to user inputs, and embedding such user-generated digital tags in the digital photographs in a non-proprietary file format;

receiving a user input to display, on the display device, one or more of the digital photographs stored in the file repository in the people view;

enabling a user to input digital photographs to the file repository, and to assign one or more of the user-generated digital tags to selected digital photographs stored in the file repository;

in response to the receiving the user input to display, (i) retrieving digital photographs from the file repository and (ii) auto-populating the display device based on one or more of the user-generated digital tags such that the retrieved digital photographs are displayed on the display device along with a portion of the assigned user-generated digital tags associated with each of the displayed digital photographs retrieved from the file repository, the displayed digital photographs being displayed in the people view, the portion of the assigned user-generated digital tags including some, but not all, of the user-generated digital tags associated with each of the displayed digital photographs;

in response to the user clicking on a first digital photograph of a first person displayed in the people view, displaying, on the display device, a people profile view for the first person including (i) a profile picture of the first person, (ii) birth information for the first person, (iii) family relationships for the first person, and (iv) one or more clickable links to other ones of the plurality of views that include one or more digital photographs of the first person;

in response to the user clicking on a displayed number of digital photographs associated with the first person displayed in the people view, displaying all of the digital photographs in the digital file repository associated with the first person; and exporting from the web-based proprietary digital photograph system, in the non-proprietary file format, one or more of the digital photographs including the associated embedded user-generated digital tags to a different web-based digital photograph system without losing the associated user-generated digital tags, so that the exported digital photographs can be viewed in the different web-based digital photograph system along with the associated user-generated digital tags.

9. The method of claim 8, further comprising the step of tracking relationships between users so that a family tree can be displayed.

10. The method of claim 8, further comprising the step of linking a recipe to a user.

11. The method of claim 8, wherein the user-generated digital tags are in an EXIF format.

12. The method of claim 8, wherein the enabling includes enabling the user to assign one or more of the user-generated digital tags to a plurality of selected digital photographs at once.

13. A computer-implemented method of storing and sharing digital photographs using a digital photograph system, the method comprising:

storing digital photographs in a file repository from which the digital photographs can be retrieved via the Internet, the digital photographs in the file repository being configured to be displayed, on a display device, in a plurality of views, the plurality of views including a gallery view, an album view, a location view, a people view, a people profile view, a family tree view, and a timeline view;

associating a plurality of user-generated digital tags of arbitrary lengths having different tag types with a first portion of the stored digital photographs in response to user inputs such that a second portion of the stored digital photographs is not associated with the plurality of user-generated digital tags, and embedding such user-generated digital tags in the first portion of the stored digital photographs in a non-proprietary file format;

receiving a user input to display, on the display device, one or more of the digital photographs stored in the file repository in the people view;

in response to the receiving the user input, (i) retrieving digital photographs from the file repository and (ii) auto-populating the display device based on one or more of the user-generated digital tags such that the retrieved digital photographs are displayed on the display device along with a portion of the assigned user-generated digital tags associated with each of the displayed digital photographs retrieved from the file repository, the displayed digital photographs being displayed in the people view, the portion of the assigned user-generated digital tags including some, but not all, of the user-generated digital tags associated with each of the displayed digital photographs;

in response to the user clicking on a first digital photograph of a first person displayed in the people view, displaying, on the display device, a people profile view for the first person including (i) a profile picture of the first person, (ii) birth information for the first person, (iii) family relationships for the first person, and (iv) one or more clickable links to other ones of the plurality of views that include one or more digital photographs of the first person; and in response to the user clicking on a displayed number of digital photographs associated with the first person displayed in the people view, displaying all of the digital photographs in the digital file repository associated with the first person.

14. The method of claim 13, wherein the portion of the assigned user-generated digital tags is determined based on the people view.

15. The method of claim 13, further comprising exporting from the digital photograph system, in the non-proprietary file format, one or more of the digital photographs including the associated embedded user-generated digital tags to a different digital photograph system without losing the associated user-generated digital tags, so that the exported digital photographs can be viewed in the different digital photograph system along with the associated user-generated digital tags.

16. The method of claim 13, further comprising in response to a user selection of a no-people-tag criterion, displaying, the display device all of the digital photographs in the digital file repository that are not associated with a person tag type.

17. The method of claim 13, further comprising in response to a user selection of a no-date-tag criterion, displaying, on the display device, all of the digital photographs in the digital file repository that are not associated with a date tag type.

18. The method of claim 13, further comprising in response to a user selection of a no-location-tag criterion, displaying, on the display device, all of the digital photographs in the digital file repository that are not associated with a location tag type.

* * * * *

UNITED STATES PATENT AND TRADEMARK OFFICE
CERTIFICATE OF CORRECTION

PATENT NO. : 9,098,531 B2  Page 1 of 1
APPLICATION NO. : 13/157214
DATED : August 4, 2015
INVENTOR(S) : Christopher J. Desmond, Nancy L. Desmond and L. Michael Taylor It is certified that error appears in the above-identified patent and that said Letters Patent is hereby corrected as shown below:

In the claims

In Column 10, Lines 31-32 (Claim 16, Lines 2-3), please delete "displaying, the display device all" and insert -- displaying, on the display device, all -- therefore.

Signed and Sealed this
Twelfth Day of January, 2016

Michelle K. Lee
*Director of the United States Patent and Trademark Office*